April 23, 1957                  LAN J. WONG                    2,789,431
                        RECORDING PRECIPITATION GAUGE
Filed Nov. 14, 1955                                        3 Sheets-Sheet 1

INVENTOR.
LAN J. WONG
BY
Edward J. Utz
HIS ATTORNEY

April 23, 1957   LAN J. WONG   2,789,431
RECORDING PRECIPITATION GAUGE
Filed Nov. 14, 1955   3 Sheets-Sheet 2

INVENTOR.
LAN J. WONG
BY Edward J. Utz
HIS ATTORNEY

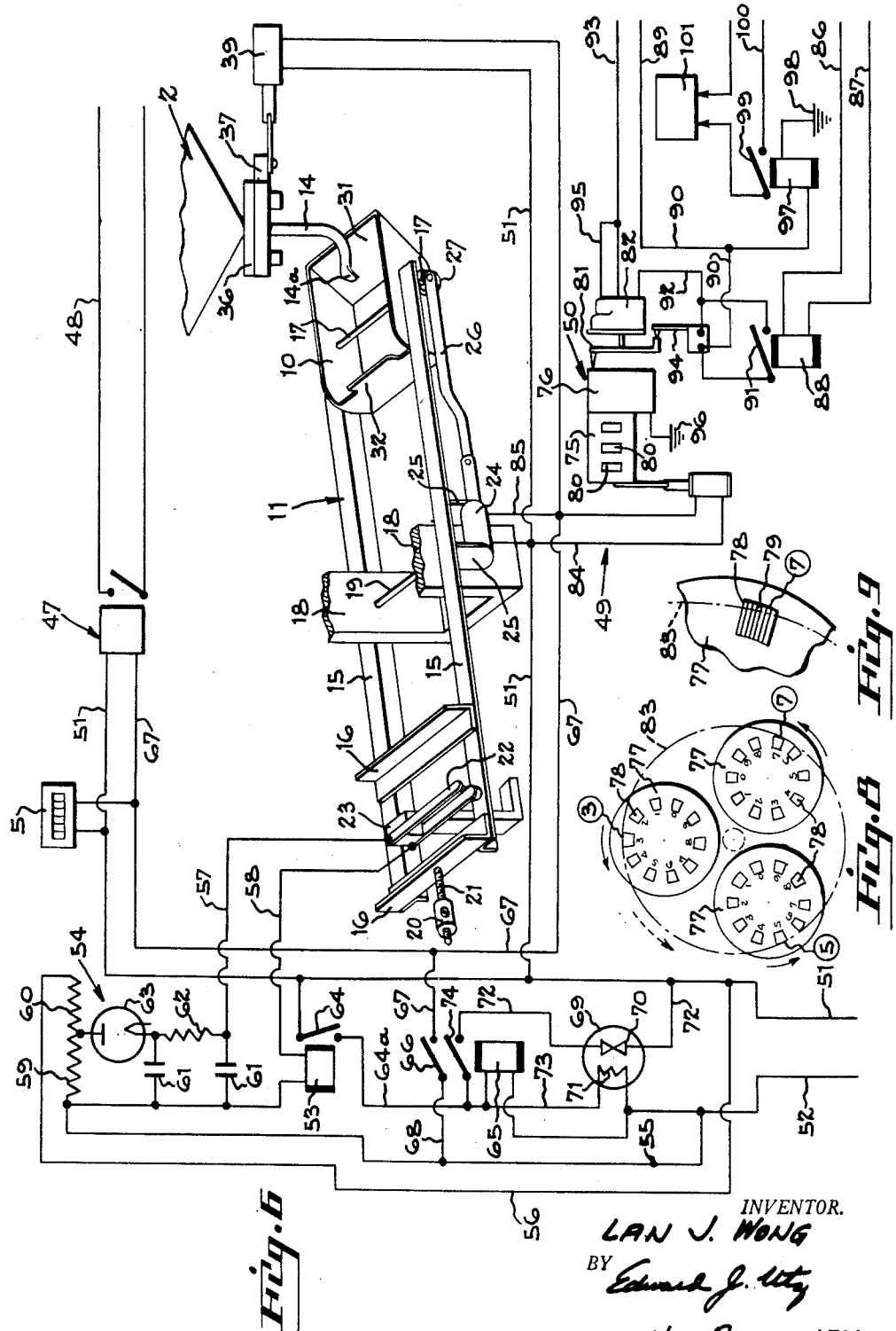

United States Patent Office 2,789,431

Patented Apr. 23, 1957

2,789,431

RECORDING PRECIPITATION GAUGE

Lan J. Wong, Cincinnati, Ohio

Application November 14, 1955, Serial No. 546,317

9 Claims. (Cl. 73—171)

This invention relates to apparatus for measuring the fall of precipitation and recording in units of water volume the total quantity reaching a given area over a prolonged period of time. More particularly, the invention resides in a self-contained apparatus which is installed out of doors and which includes a receiver for collecting the precipitation and a housing enclosing electrically operated measuring and recording apparatus.

The well known rain gauges used in the past consist essentially of a funnel-shaped receiver having an open top and a container for receiving the accumulated rainfall from the receiver. The container includes graduations indicating the actual depth of rainfall according to the liquid level in the container. This instrument provides fairly accurate measurement but is useable only locally since it must be inspected at frequent intervals, and emptied by hand.

Another type of rain gauge for accumulating incremental precipitation, as distinguished from the simple indicator above, has also been available. This instrument includes a receiver feeding to a tilt bucket which is pivotally mounted in an unstable condition so as to tilt itself automatically when a predetermined quantity of water is accumulated in the bucket. To record the accumulated precipitation, a recording counter is connected to the bucket to register each tilting movement, the counter thereby recording the total incremental rainfall during a prolonged period of time.

This type of instrument, being mechanical and depending upon the unbalanced condition of the bucket, is inaccurate. For example, the unbalanced bucket is susceptible for the force of the stream of water acting upon it. This introduces measurement errors which are particularly noticeable during heavy rains due to the dynamic action of the flow stream from the receiver, which tends to tilt the bucket. Under the same conditions, an error is introduced by the sudden rebound of the bucket after discharging the rebound causes a portion of the measured quantity of water to be retained in the bucket and thereby decreases the quantity metered on the next discharge motion.

Briefly therefore, the simple indicator gauge of the past has the disadvantage of requiring frequent inspection and service, while the self-registering type fails to produce accurate records of total rainfall.

A primary object of the present invention has been to create a completely automatic gauge which records the precipitation with precision and which performs its operation automatically over a prolonged period of time in a reliable manner without attention.

A further object has been to provide a gauge of this character which records, in terms of actual water volume, the fall of precipitation in the form of rain, snow, hail or sleet.

Briefly expressed, the invention is based upon the circuit to determine accurately, the quantity of water in the hopper, the control circuit regulating the operation of power means to record the measurement and to empty the hopper. The use of electrical control and power means is found to eliminate the errors in measuring which inherently prevail in mechanically operated apparatus.

According to the present invention, the hopper is carried on a scale beam arranged to deflect under a predetermined weight load of water and to close a sensitive electrical control switch. A solenoid, mounted on the scale beam, is connected to the hopper to tilt it to discharge position. A solenoid actuated gate valve is interposed in a conduit leading from the receiver to the scale hopper and is arranged to block the flow of water while the hopper is tilted by the solenoid.

The circuit includes a time delay relay which maintains both solenoids in energized condition for a predetermined period of time. The delay action prevails for a sufficient time to allow all of the measured water to drain from the scale hopper while the gate valve prevents loss of water from the receiver while the hopper is tilted. Therefore, during a heavy rain, the gate valve prevents any loss of water from the receiver while the hopper is tilted so as to eliminate measurement errors during this phase of the cycle.

To eliminate dynamic errors produced by the force of flow stream discharged into the hopper, the scale beam is provided with a sensitive damper which presents no resistance to scale beam motion at a slow rate, but which damps out sudden forces acting against it tending to overbalance the beam prematurely, such as a sudden discharge of water into the hopper. The discharge conduit includes a nozzle arranged to prevent the dynamic force of the flow stream from acting upon the hopper. In practice, the damper action, combined with the nozzle action, is found to practically eliminate all errors normally introduced by flow stream action.

Power operation of the scale hopper to its discharge position, as regulated by the control switch and time delay relay, eliminates metering errors due to residual water in the hopper after discharge. This further increases the measurement precision of the apparatus.

In order to measure the water content of snow, hail, and the like, the apparatus is provided with heating equipment which converts the frozen precipitation to water. The melted water is then measured and its total quantity, in terms of weight, is measured and recorded.

The electrical control system is arranged to actuate a recording counter mounted in the gauge and also to store and transmit the information, in the form of electrical impulses, from the gauge apparatus to a central receiving station. This makes it possible to install a number of gauges at remote points, the several gauges transmitting the information to the receiving station, thereby providing a complete record of rainfall over the entire area under observation by the gauges.

Further advantages will be more clearly apparent to those skilled in the art from the following description of the drawings which represent one preferred embodiment of the invention.

Figures 1, 2:
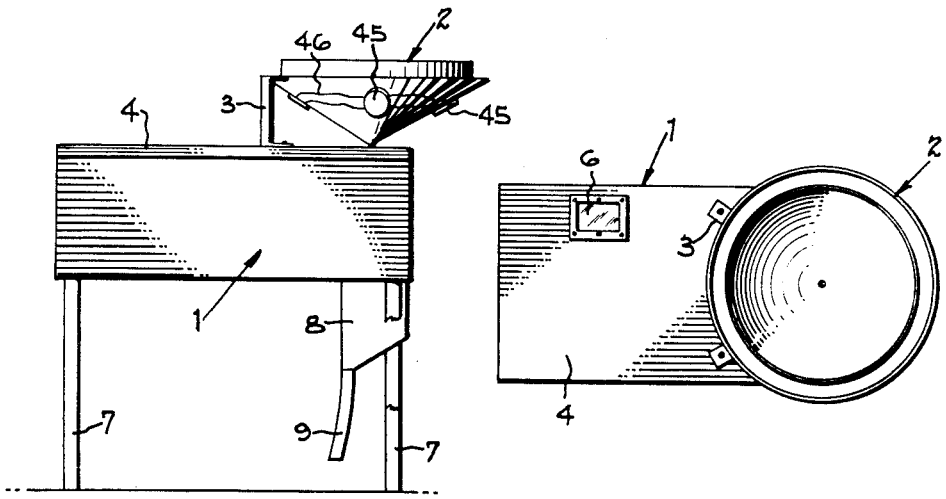
Figure 1 is a side elevation of the recording gauge of the present invention, showing the general organization of its parts.
Figure 2 is a top plan view of the gauge shown in Figure 1.
Figures 5, 7:
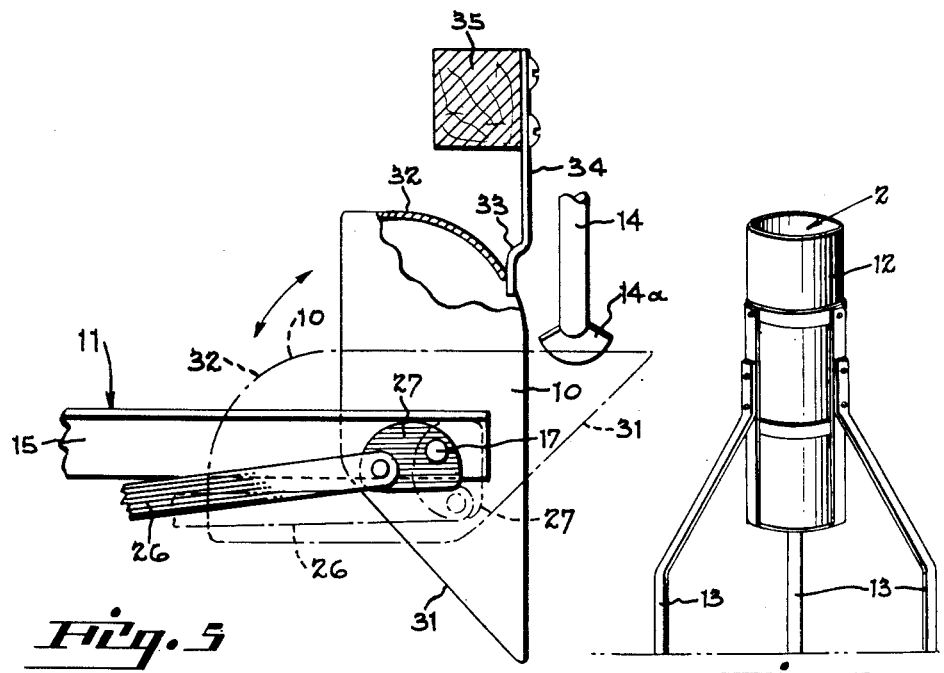
Figure 3:
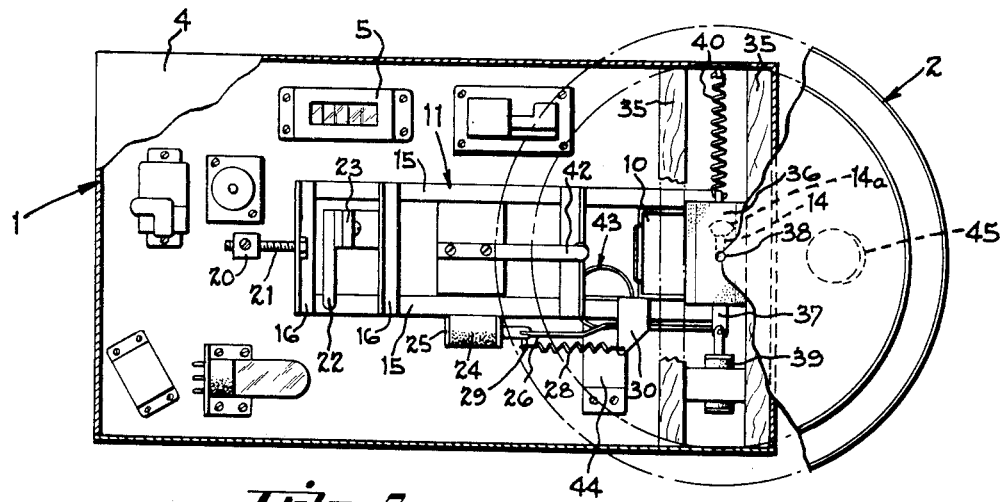
Figure 3 is an enlarged top plan view of the gauge with the housing broken away to show the arrangement of internal parts.
Figure 4:
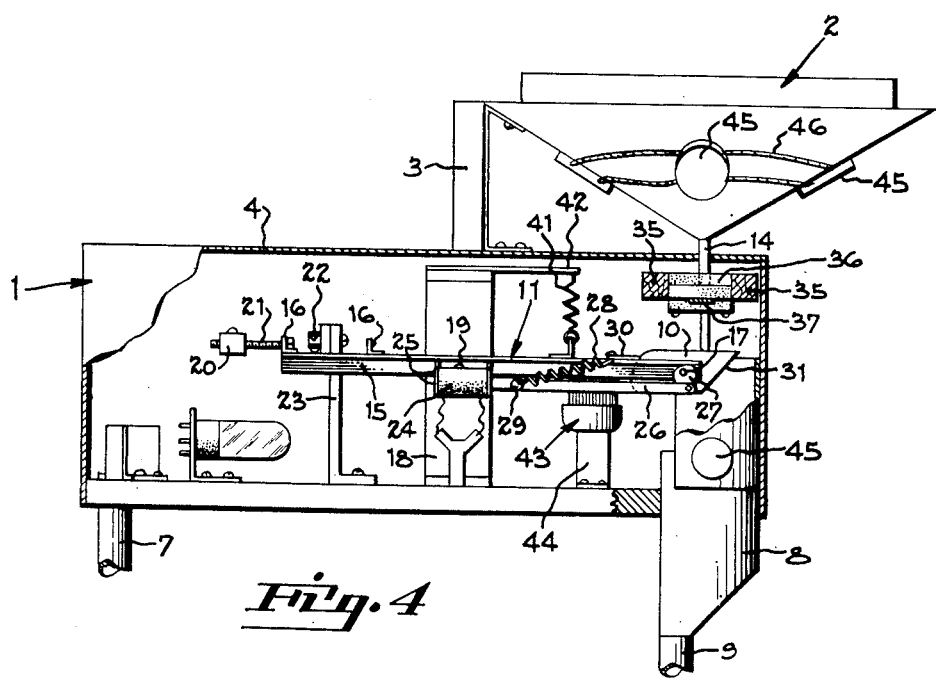

The holding circuit is regulated by the holding contact 74 of power relay 65 upon energization of the power relay. The holding circuit is completed from A. C. line 51, line 72, through delay contact 70, through holding contact 74, to one side of the power relay. The circuit is completed through the relay coil by line 72 to A. C. line 52. The heater 71 is in parallel with relay coil 65. This circuit maintains the solenoids of the hopper, valve, counter, and sending relay 74 in energized condition according to the setting of the time delay relay. When the resistor 71 heats the bi-metallic, normally closed contact 70, the contact opens, thus deenergizing the holding circuit of the power relay. This causes both contacts of the power relay 65 to open and deenergize the solenoids, thereby to return the hopper to receiving position; to open the gate valve; to condition the counter to record the next discharge cycle; and to deenergize sending relay 47.

Operation

Briefly, therefore, when the measuring hopper overbalances the scale beam, it closes sensitive switch 22 to energize the sensitive D. C. relay 53 which closes its contacts to energize the power delay 65. Upon being energized, power relay 65 closes its contacts 66 to energize the tilt solenoid 24, valve solenoid 39, recording counter 5, and sending relay 47. It also energizes the telemeter storage as explained later. At the same time, the holding contact 74 of the power relay 65 completes the holding circuit from the A. C. power lines by way of the normally closed contact 70 and resistance heater 71 of the time delay 69. The holding circuit energizes the power relay 65 for a timed period sufficient for the discharge operation and deenergizes the solenoids after the delay period.

Accordingly, upon each overbalance action of the scale beam to close sensitive switch 22, its scale hopper is tilted in a positive manner to discharge position and the gate valve 36 is closed. At the same time the counter is energized to record the discharge operation, the signal solenoid 47 closes the sending circuit, and the telemeter storage circuit 49 records the cycle for future transmittal to its receiving station. After the time delay, the components are returned in a positive manner by their springs to normal position for the next cycle.

Telemeter circuit

The telemeter or keying circuit indicated at 49 in Figure 6 is arranged to store the impulses generated upon each discharge movement of the hopper and to transmit the total precipitation when triggered from its receiving station. For this purpose, its recording apparatus 50 includes an electrically operated counter 75 energized by circuit 49 and in driving connection with a storage unit indicated diagrammatically at 76. In the embodiment shown in Figure 8, the storage unit comprises three storage disks 77 which includes sectors or groups 78 of contacts 79 (Figure 9), corresponding in number to the digits exposed on counter 5 and on counter 75. The contact sectors 76 are ten in number, corresponding to the digits from "0" to "9" of the three reading dials 80 of the counters. With the exception of the "0" groups, the respective sectors are made up of contact strips 79 for sending the signal impulses corresponding to the digits exposed on the dials of the counters. In other words, the sector representing the digit "1" consists of one contact; the sector representing "2" has two contacts; and the remaining sectors increase one contact each, up to nine contacts for the digit "9."

It will be understood that each reading dial 80 of counter 75 has a corresponding storage disk 77, the apparatus illustrated being provided with three disks 77. For purposes of simplicity, the driving system of the disks has been omitted but it will be understood that each disk is rotated by one of the dials of counter 75 independently of the other dials and disks.

The data carried on the disks is transmitted to the telemeter circuit by a contact probe 81 driven by a motor 82. The probe is rotated in a circular path 83 relative to the disks through a single cycle of rotation each time the motor is energized. The disks are so located that the contact probe 81 sweeps across the groups of contacts corresponding to the digits exposed on counter 75 (Figure 9).

The counter 75 of the telemeter circuit is advanced upon closing of the power relay 65 by way of branch lines 84 and 85, which are connected to the lines 51 and 67 of the power solenoids; the telemeter circuit is initiated at the receiving station by operation of a switch (not shown) which energizes lines 86 and 87 leading to a cycle starting relay 88. Upon closing of relay 88, the circuit is closed from the power line 89, branch line 90 through the contact 91 of starting relay 88 to motor 82 by way of line 92.

The motor includes a holding circuit having a motor position switch 94 which completes the holding circuit, shunting the contact 91 of starting relay 88 after the motor starts. Position switch 94 normally is open and is closed when the motor starts. After the position switch 94 closes, the holding circuit is completed by way of power 89, branch line 90, through the position switch 94 to line 92, and through the motor to power line 93. At the end of the cycle, when the motor reaches its starting point, position switch 94 opens and deenergizes the holding circuit and motor.

The data is transmitted from the storage unit 76 by way of branch power line 95 which connects power line 93 to the housing of motor 82 and energizes probe 81. The probe completes a circuit from branch power line 95, motor housing 82, through probe 81 to contacts digit 79 of sectors 78. The contacts 79 are connected to the housing of storage unit 76 which is grounded as at 96. One side of a sending relay 97 is also grounded as at 98; thus the sending relay 97 is energized by power line 89 on one side and from power line 93 by way of probe 81, digit contacts 79, and from ground 96 to ground 98.

As the probe contact travels across the exposed digit contacts 79, which are insulated from one another, a number of electrical impulses is generated, corresponding to the digit which the group of contacts represents. These impulses are transmitted from the probe and its contacts, thus energizing sending relay 97 intermittently a number of times equal to the digits represented by the contacts. As the sending relay intermittently is energized, its contact 99 closes, thereby completing the output signal circuit indicated at 100, which may lead to a recording counter at the receiving station.

As indicated in Figure 8, by way of example, contact sectors representing a reading of "357" are exposed on the storage disks. As the probe traverses the three disks from its starting position, it crosses these sectors, starting with the sector representing the digit "3," and thereby transmits three groups of impulses at spaced intervals, representing the exposed digits.

The output signal circuit 100 may include a supervisory time control circuit, as indicated in block form at 101 to regulate the duration of signal impulses generated by the sending relay 97.

The device can also be adapted for using volume measurements consisting of a stationary cam 101, having a discharge means such as a normally closed gate valve 102, and having an insulated probe 103 which on contact with the water will act upon an amplifier and cause operation of the solenoid 5 for the discharge valve and the power operated gate valve. The probe 103 is adjustable to the height providing the incremental volume of precipitation which it is desired to measure.

Having described my invention I claim:

1. An apparatus for measuring the quantity of water precipitated during a given period of time comprising, an open receiver for collecting the precipitation, a weight measuring device including a pivotally mounted container, conduit means including a power operated gate valve, said conduit connected to the receiver and communicating with the container, said valve being normally open and closing when energized, said container normally residing in position to collect water flowing from the receiver through the conduit, the container having a power element for pivoting the same relative to the weight measuring device to an inclined discharge position, a control element connected to the power element and to the power operated valve for energizing the same in unison, the control element located in a position to be actuated by said measuring device in response to a given weight load of water in the container and energizing the power element and power operated gate valve, thereby shifting the container to said inclined discharge position and closing the gate valve to block the flow of water while the container is in said discharge position, and an electrically operated recording counter connected to the said control element for recording the movements of the scale hopper to said discharge position.

2. An apparatus for measuring the quantity of water precipitated during a given period of time comprising, an open receiver for collecting the precipitation, a weight measuring device including a movable scale hopper, conduit means including a power operated gate valve, said conduit connected to the receiver and communicating with the said hopper, said valve being normally open and closing when energized, said hopper normally residing in position to collect water flowing from the receiver through the conduit, the hopper having a power element for shifting the same relative to the weight measuring device to a discharge position, a control element connected to the hopper power element and to the valve for energizing the same, the control element located in a position to be actuated by said weight measuring device in response to a given weight load of water in the hopper and energizing the hopper power element and valve, thereby shifting the hopper to said discharge position and closing the valve to block the flow of water from the receiver while the hopper is in said discharge position, and time delay means connected to the valve and hopper power element, said time delay means energizing the valve and hopper power element for a predetermined period independently of the control element, thereby to maintain the gate valve in closed position and to maintain the hopper in discharge position for sufficient time to provide complete drainage of water therefrom, and an electrically operated recording counter connected to the said control element for recording the movements of the scale hopper to said discharge position..

3. An apparatus for measuring the total quantity of precipitation over a given period of time comprising, a receiver having an open top for collecting the precipitation, said receiver having a discharge opening, a scale hopper positioned relative to said discharge opening for receiving the water collected in the receiver, a pivotally mounted scale beam, pivot means connecting the scale hopper to an end portion of scale beam, said pivot means providing movement of the scale hopper from a receiving position to an inclined discharge position relative to the scale beam, a solenoid mounted on the scale beam and connected to the scale hopper for tilting the same to said discharge position, an electrical control switch positioned to be closed by the scale beam upon movement thereof, a time delay relay in electrical connection with said control switch, said time delay being electrically connected to the said solenoid and providing a predetermined period of energization after the same is energized by the said control switch, the solenoid thereby shifting the hopper to said inclined discharge position upon being energized by the control switch, said time delay relay maintaining the hopper in said discharge position for a predetermined time period, and spring means connected to the hopper biasing said solenoid and pivoting the said hopper to said receiving position when the solenoid is deenergized by the time delay relay, and an electrically operated recording counter connected to the said control switch for recording the movements of the scale hopper to said discharge position.

4. An apparatus for measuring the total quantity of precipitation over a given period of time comprising, a receiver having an open top for collecting the precipitation, said receiver having a discharge opening, a scale hopper positioned relative to said discharge opening for receiving the water collected in the receiver, a pivotally mounted scale beam, pivot means connecting the scale hopper to an end portion of scale beam, said pivot means providing tilting movement of the scale hopper from a horizontal receiving position to an inclined discharge position relative to the scale beam, a solenoid mounted on the scale beam and connected to the scale hopper for tilting the same to said inclined discharge position, an electrical control switch positioned to be closed by the scale beam upon rocking movement thereof, a gate valve interposed in the conduit means, a solenoid connected to the gate valve for closing the same, a time delay relay in electrical connection with said control switch, said time delay being electrically connected to the solenoids of the hopper and valve and providing a predetermined period of energization after the solenoids are energized by the said control switch, said relay thereby maintaining the hopper to said inclined discharge position and maintaining the gate valve in closed position for a predetermined period after the control switch opens to provide complete drainage of the hopper, and spring means biasing said solenoids and shifting the hopper to said receiving position and opening the gate valve when said solenoids are deenergized, and an electrically operated recording counter connected to the said control switch for recording the movements of the scale hopper to said discharge position.

5. An apparatus for measuring the total quantity of precipitation over a given period comprising, a receiver having an open top for collecting the precipitation, a scale hopper, said receiver having an opening communicating with said scale hopper for delivering the water collected in the receiver, a pivotally mounted scale beam, pivot means connecting the scale hopper to an end portion of the scale beam adapting the hopper to be tilted to a discharge position, a counterweight mounted on the opposite end portion of the scale beam, said counterweight balancing the weight load of water collected in the scale hopper, a solenoid mounted on the scale beam and connected to the scale hopper for shifting the hopper to said discharge position, an electrical control switch mounted in position to be actuated by the scale beam upon overbalanced movement thereof by the scale hopper, electrical means connecting the control switch to said solenoid for energizing the solenoid when the control switch is actuated, thereby discharging the water from the scale hopper, and an electrically operated recording counter connected to the said control switch for recording the movements of the scale hopper to said discharge position.

6. An apparatus for measuring and recording the total quantity of precipitation over a given period comprising, a receiver having an open top for collecting the precipitation, a scale hopper, said receiver having an opening communicating with said scale hopper for delivering the water collected in the receiver, a pivotally mounted scale beam, pivot means connecting the scale hopper to an end portion of the scale beam adapting the hopper to be tilted to a discharge position, a counterweight mounted on the opposite end portion of the scale beam, said counterweight balancing the weight load of the water to be collected in the scale hopper, a solenoid mounted on the scale beam and connected to the scale hopper for shifting the hopper to said discharge position, an electrical control switch mounted in position to be actuated by the scale beam upon overbalanced movement thereof by the scale hopper, a dash pot connected to the scale beam and retarding the movement thereof when the scale hopper overbalances the counterweight, electrical means connecting the control switch to said solenoid when the control switch is actuated, thereby discharging the water from the hopper, and time delay means in electrical connection with the control switch and solenoid, the time delay relay energizing the solenoid for a predetermined time after the control switch is actuated to provide complete drainage of the scale hopper, and an electrically operated recording counter connected to the said control switch for recording the movements of the scale hopper to said discharge position.

7. An apparatus for measuring the total quantity of precipitation over a given period of time comprising, a housing including a base, a receiver mounted above the housing and having an open top for collecting the precipitation, a scale hopper in the housing, the receiver having a discharge conduit leading to the scale hopper for delivering the water from the receiver to the hopper, a scale beam in the housing comprising a pair of spaced parallel bars, pivot means rising from the base and supporting the scale beam at a point intermediate the length of the beam, the scale hopper residing between said bars at one end portion of the scale beam, pivot means connecting the hopper to the bars and providing movement of the hopper from a receiving position to a tilted discharge position relative to the beam, a solenoid mounted on one side of said bars, a crank secured to the hopper, a link connecting the solenoid to the crank for tilting the hopper when the solenoid is energized, an electrical control switch positioned to be closed by the scale beam when the hopper overbalances the beam, said switch electrically connected to the solenoid and energizing the solenoid when the switch is closed, a damper element mounted on the base and connected to the scale beam at a point between the hopper and pivot means of the beam, the damper element retarding the overbalance motion of the beam, the scale beam thereby moving at a retarded rate to close the control switch and tilt the hopper to discharge position after said scale beam movement is completed, and an electrically operated recording counter connected to the said control switch for recording the movements of the scale hopper to said discharge position.

8. An apparatus for measuring the total quantity of precipitation over a given period of time comprising, a housing including a base, a receiver mounted above the housing and having an open top for collecting the precipitation, a scale hopper in the housing, the receiver having a discharge conduit leading to the scale hopper for delivering the water from the receiver to the hopper, a scale beam in the housing comprising a pair of spaced parallel bars, pivot means rising from the base and supporting the scale beam at a point intermediate the length of the beam, the scale hopper residing between said bars at one end portion of the scale beam, pivot means connecting the hopper to the bars and providing movement of the hopper from a receiving position to a tilted discharge position relative to the beam, a solenoid mounted on one of said bars, a link connecting the solenoid to the hopper for tilting the hopper when the solenoid is energized, an electrical control switch positioned to be closed by the scale beam when the hopper overbalances the beam, a damper element mounted on the base and connected to the scale beam retarding the overbalance movement thereof, a gate valve interposed in the said discharge conduit, a solenoid connected to the valve for closing the valve, a time delay element in electrical connection with the control switch and with said solenoids and providing timed energization of the solenoids upon momentary closing of the control switch, thereby maintaining the hopper in tilted position and the valve in closed position for complete drainage of the hopper while the valve blocks the flow of water from the hopper, and an electrically operated recording counter connected to the said control switch for recording the movements of the scale hopper to said discharge position.

9. An apparatus for measuring the total quantity of precipitation over a given period of time comprising, a housing including a base, a receiver mounted above the housing and having an open top for collecting the precipitation, a scale hopper in the housing, the receiver having a discharge conduit leading to the scale hopper for delivering the water from the receiver to the hopper, a scale beam in the housing comprising a pair of spaced parallel bars, pivot means rising from the base and supporting the scale beam at a point intermediate the length of the beam, the scale hopper residing between said bars at one end portion of the scale beam, pivot means connecting the hopper to the bars and providing movement of the hopper from a receiving position to a tilted discharge position relative to the beam, a solenoid mounted on one of said bars, a link connecting the solenoid to the hopper for tilting the hopper when the solenoid is energized, an electrical control switch positioned to be closed by the scale beam when the hopper overbalances the beam, a damper element mounted on the base and connected to the scale beam and retarding the overbalance movement thereof, a gate valve interposed in the said discharge conduit, a nozzle on the discharge end of the said conduit, said nozzle projecting the flow stream of water relative to the hopper in a direction to neutralize the force thereof, and a solenoid connected to the valve for closing the valve, the said solenoids of the hopper and valve electrically connected to the control switch and being energized upon closing of the control switch, thereby shifting the hopper to tilted position and closing the valve for drainage of the hopper while the valve blocks the flow of water from the receiver, and an electrically operated recording counter connected to the said control switch for recording the movements of the scale hopper to said discharge position.

References Cited in the file of this patent
UNITED STATES PATENTS

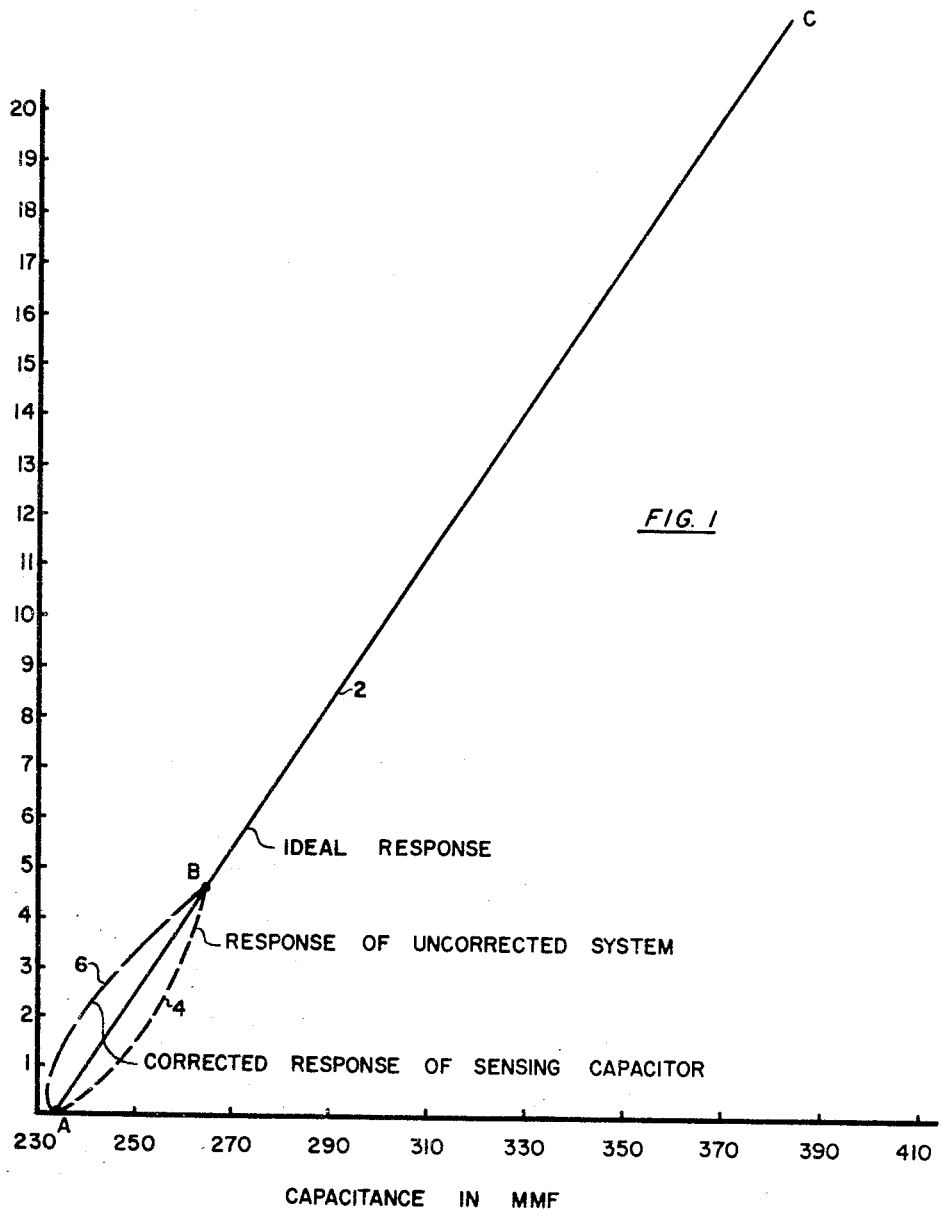

| | | |
|---|---|---|
| 2,202,452 | Hildabrand | May 28, 1940 |
| 2,579,708 | Smith et al. | Dec. 25, 1951 |
| 2,642,564 | Sterens | June 16, 1953 |
| 2,701,472 | Allen et al. | Feb. 8, 1955 |